United States Patent
Eisenmann et al.

(10) Patent No.: US 9,442,751 B2
(45) Date of Patent: Sep. 13, 2016

(54) VIRTUAL CREDENTIAL ADAPTER FOR USE WITH VIRTUAL MACHINES

(71) Applicant: International Business Machines Corporation, Armonk, NY (US)

(72) Inventors: Christine L. Eisenmann, Lewisville, TX (US); Louis T. Fuka, Austin, TX (US); James W. Moody, Denton, TX (US); Washington E. Munive, Alpharetta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 14/223,223

(22) Filed: Mar. 24, 2014

(65) Prior Publication Data
US 2015/0268982 A1    Sep. 24, 2015

(51) Int. Cl.
| | |
|---|---|
| G06F 9/445 | (2006.01) |
| G06F 9/455 | (2006.01) |
| G06F 9/46 | (2006.01) |
| G06F 7/04 | (2006.01) |
| G06F 21/00 | (2013.01) |
| G06F 21/62 | (2013.01) |

(52) U.S. Cl.
CPC .......... *G06F 9/45558* (2013.01); *G06F 21/00* (2013.01); *G06F 21/6281* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 7,590,867 B2 | 9/2009 | Scarlata et al. | |
| 8,079,030 B1* | 12/2011 | Satish | H04L 63/14 713/164 |
| 8,131,987 B2 | 3/2012 | Lo et al. | |
| 8,380,974 B2 | 2/2013 | Lo et al. | |
| 8,694,781 B1* | 4/2014 | Griffin | G06F 9/45558 713/168 |
| 2003/0046391 A1* | 3/2003 | Moreh | H04L 63/0281 709/225 |

(Continued)

FOREIGN PATENT DOCUMENTS

CN    102546601 A    7/2012

OTHER PUBLICATIONS

"vSecurity Architecture Overview" [online] Catbird Networks, Inc., [retrieved Feb. 13, 2014] retrieved from the Internet: <http://www2.catbird.com/our_services/architecture.php>, 5 pg.

(Continued)

*Primary Examiner* — James D Rutten
(74) *Attorney, Agent, or Firm* — Cuenot, Forsythe & Kim, LLC (57) ABSTRACT

Managing credential for use with virtual machines includes storing a first virtual credential adapter within a hypervisor executing within a host data processing system. The first virtual credential adapter maintains a credential for a computing resource. Using a processor of the host data processing system, associating the first virtual credential adapter with a first virtual machine. The first virtual credential adapter is associated, at most, with a single virtual machine at any time. Responsive to associating the first virtual credential adapter with the first virtual machine, the first virtual machine accesses the computing resource using the credential maintained by the first virtual credential adapter.

20 Claims, 5 Drawing Sheets

(56) References Cited

U.S. PATENT DOCUMENTS

| | | | |
|---|---|---|---|
| 2005/0289644 A1* | 12/2005 | Wray | G06F 21/41 726/5 |
| 2007/0094719 A1* | 4/2007 | Scarlata | G06F 21/53 726/9 |
| 2008/0092137 A1* | 4/2008 | Anderson | G06F 1/3209 718/1 |
| 2012/0054486 A1 | 3/2012 | Lakkavalli et al. | |
| 2013/0065557 A1* | 3/2013 | Zhang | H04W 12/06 455/411 |
| 2013/0085880 A1* | 4/2013 | Roth | G06F 21/602 705/26.1 |
| 2013/0191895 A1* | 7/2013 | Magee | G06F 21/6218 726/6 |

OTHER PUBLICATIONS

"Overview of Hyper-V," [online] Microsoft © 2014, updated Mar. 24, 2010 [retrieved Feb. 13, 2014] retrieved from the Internet: <http://technet.microso••.com/en - us/library/cc816638(WS.10).aspx>, 3 pg.

"Unisphere Unified Storage Management Software & Virtualization—EMC," [online] EMC Corporation © 2014 [retrieved Feb. 13, 2014] retrieved from the Internet: <http://www.emc.com/storage/vnx/unisphere.htm>, 2 pg.

"Sourcefire—Next-Generation Network Security," [online] Cisco © 2014 [retrieved Feb. 13, 2014] retrieved from the Internet: <http://www.sourcefire.com/products/next-generation-network-security>, 3 pg.

"vCloud Networking and Security," [online] VMWare, Inc. © 2014 [retrieved Feb. 13, 2014] retrieved from the Internet: <http://www.vmware.com/products/vcloud-network-security>, 4 pg.

"Unified Management for Cloud OS with System Center 2012 R2," [online] Microsoft @ 2014 [retrieved Feb. 13, 2014] retrieved from the Internet: <http://www.microsoft.com/en-us/server-cloud/products/system-center-201242/default.aspx#fbid=2QL1x2mNK22>, 11 pg.

"Deltacloud Drivers," [online] Apache Deltacloud, Apache Software Foundation, Oct. 2011 [retrieved Feb. 13, 2014] retrieved from the Internet: <https://deltacloud.apache.org/drivers.html>, 4 pg.

"Oracle VM VirtualBox User Manual—Remote Virtual Machines," [online] Oracle Corporation © 2004-2014, Chapter 7, pp. 103-112 [retrieved Feb. 13, 2014] retrieved from the Internet: <http://www.virtualbox.org/manual/ch07.html>, 13 pg.

"Oracle VM VirtualBox User Manual - VBoxManage modifyvm," [online] Oracle Corporation © 2004-2014, Chapter 8, pp. 125-132 [retrieved Feb. 13, 2014] retrieved from the Internet: <http://www.virtualbox.org/manual/ch08.html>, 50 pg.

"IBM Research—Virtual Trusted Platform Module (TPM)," [online] IBM Corporation [retrieved Feb. 13, 2014] retrieved from the Internet: <http://researcher.watson.ibm.com/researcher/view_project_php?id=2850>, 3 pg.

Suzaki, K. et al., "Virtual TPM on Xen/KVM for Trusted Computing," [online] Virtualization Mini Summit on Linuxsymposium 2008, Ottawa, Jul., 2008, [retrieved Feb. 13, 2014] retrieved from the Internet: <http://openlab.ring.gr.jp/oscircular/OLS08-Virtualization-Suzaki.pdf>, 30 pg.

\* cited by examiner

VIRTUAL CREDENTIAL ADAPTER FOR USE WITH VIRTUAL MACHINES

BACKGROUND

A virtual machine (VM) is a software implementation of a physical machine such as a computer system. A virtual machine executes program code like a physical computer system. A host computing system is a physical computing system that runs a hypervisor. The hypervisor runs one or more "guest" virtual machines. In the case where the host computing system executes more than one virtual machine using a hypervisor, the resources of each virtual machine, e.g., random access memory, central processing unit, etc., may be isolated from the resources of each other virtual machine. In other aspects, the virtual machines may not be completely isolated from one another in that two or more virtual machines may communicate over a network, access a common file share, or the like. In any case, by running a hypervisor, the host computing system has the ability to execute multiple, different virtual machines and/or multiple instances of one or more virtual machines concurrently. This ability allows the host computing system to execute virtual machines that use different instruction sets and/or operating systems at the same time.

Virtual machines require credentials for the same reasons that their physical computer system counterparts require credentials. For example, virtual machines may require credentials to access third party systems such as applications, databases, or the like. Unlike physical computing systems, virtual machines also must be managed by tools that perform operations on behalf of the virtual machines. The credentials utilized by the virtual machine must be available to the virtual machine during execution. If, however, the credentials are managed by the virtual machine itself, such credentials are not available to other entities when the virtual machine is not executing.

SUMMARY

A method includes storing a first virtual credential adapter within a hypervisor executing within a host data processing system. The first virtual credential adapter maintains a credential for a computing resource. The method also includes associating, using a processor of the host data processing system, the first virtual credential adapter with a first virtual machine. The first virtual credential adapter is associated, at most, with a single virtual machine at any time. Responsive to associating the first virtual credential adapter with the first virtual machine, the first virtual machine accesses the computing resource using the credential maintained by the first virtual credential adapter.

A system includes a processor programmed to initiate executable operations. The executable operations include storing a first virtual credential adapter within a hypervisor executing within a host data processing system. The first virtual credential adapter maintains a credential for a computing resource. The executable operations also include associating, using the processor, the first virtual credential adapter with a first virtual machine. The first virtual credential adapter is associated, at most, with a single virtual machine at any time. Responsive to associating the first virtual credential adapter with the first virtual machine, the first virtual machine accesses the computing resource using the credential maintained by the first virtual credential adapter.

A computer program product includes a computer readable storage medium having program code stored thereon. The program code is executable by a processor to perform a method. The method includes storing, using the processor, a first virtual credential adapter within a hypervisor executing within a host data processing system. The first virtual credential adapter maintains a credential for a computing resource. The method further includes associating, using the processor, the first virtual credential adapter with a first virtual machine. The first virtual credential adapter is associated, at most, with a single virtual machine at any time. Responsive to associating the first virtual credential adapter with the first virtual machine, the first virtual machine accesses, using the processor, the computing resource using the credential maintained by the first virtual credential adapter.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to managing credentials within a virtualized computing environment. In accordance with the inventive arrangements disclosed herein, credentials are managed within a virtual computing environment using virtual adapters. A virtual adapter that is used to maintain a credential is called a "virtual credential adapter" or a "VCA." Each VCA resides within a hypervisor executing within a host data processing system. A VCA may be associated with, and/or disassociated from, various virtual machines (VMs) managed by the hypervisor. In another aspect, credentials also may be moved among different ones of the VCAs within the hypervisor, whether or not such VCAs are associated with a VM.

Hypervisors are, in effect, pre-configured to manage virtual adapters. In this regard, a hypervisor is able to enforce a policy in which a VCA, like a conventional virtual adapter, is associated with, at most, one VM at any given time. A VCA that is not currently associated with a VM may be stored within a pool of VCAs maintained within the hypervisor. In this regard, the VCA is a separate entity than the particular VM with which the VCA may be associated. Because credentials are managed using an entity that is separate and independent of the VMs, the hypervisor may access a VCA to manage any credentials maintained by the VCA regardless of whether the VCA is associated with a VM or the VM is executing.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. As used herein, "automatically" means without human intervention.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a Web browser (e.g., Web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
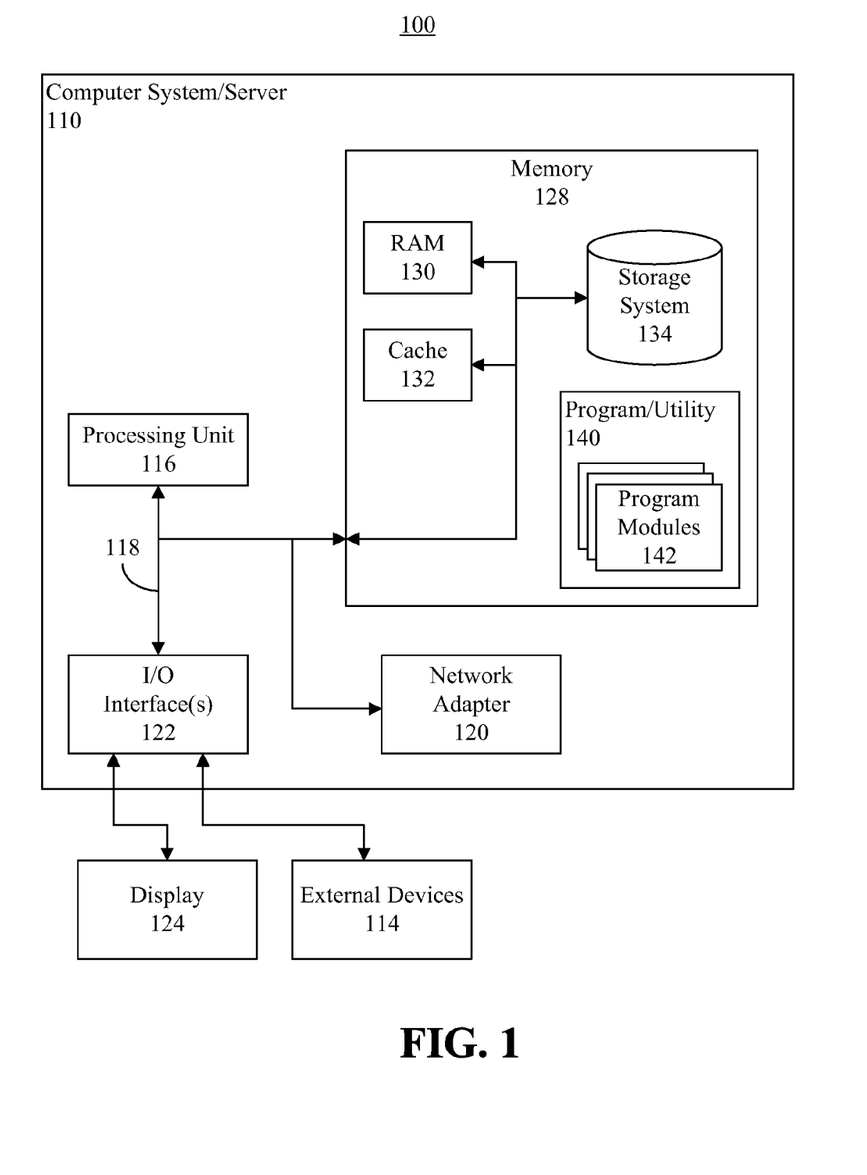
FIG. 1 depicts an exemplary cloud computing node.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Further, cloud computing node 100 is an example of a data processing system. Regardless, cloud computing node 10 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device or data processing system. The components of computer system/server 110 may include, but are not limited to, one or more processors or processing units 116, a system memory 128, and a bus 118 that couples various system components including system memory 128 to processing unit 116.

Processing unit(s) 116 means at least one hardware circuit (e.g., an integrated circuit) configured to carry out instructions contained in program code. Examples of a processing unit include, but are not limited to, one or more central processing units (CPUs), one or more array processors, one or more vector processors, one or more digital signal processors (DSPs), one or more field-programmable gate arrays (FPGAs), one or more application specific integrated circuit (ASICs), one or more controllers, and various combinations and/or permutations of the foregoing examples.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and includes both volatile and non-volatile media, removable and non-removable media.

System memory 128 can include computer system readable media in the form of volatile memory, such as random access memory (RAM) 130 and/or cache memory 132. Computer system/server 110 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 110 may also communicate with one or more external devices 114 such as a keyboard, a pointing device, a display 124, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 122. Still yet, computer system/server 110 can communicate with one or more networks such as a local area network (LAN), a general wide area network (WAN), and/or a public network (e.g., the Internet) via network adapter 120. As depicted, network adapter 120 communicates with the other components of computer system/server 110 via bus 118. It should be understood that although not shown, other hardware and/or software components could be used in conjunction with computer system/server 110. Examples, include, but are not limited to: microcode, device drivers, redundant processing units, external disk drive arrays, RAID systems, tape drives, and data archival storage systems, etc.

In one aspect, computer system/server 110 is a computer or other programmable data processing apparatus that is suitable for storing and/or executing program code. It should be appreciated, however, that computer system/server 110 may be implemented in the form of any system including a processor and memory that is capable of performing and/or initiating the functions and/or operations described within this disclosure. Further, computer system/server 110 may be implemented in any of a variety of different form factors.

Program modules 142 are implemented as executable program code executed by processing unit 116. As such, program modules 142 are considered an integrated part of computer system/server 110. Computer system/server 110, in executing program modules 142, performs and/or initiates the various functions and/or operations described within this disclosure. Further, program modules 142, including any parameters and/or attributes utilized by program modules 142, are functional data structures that impart functionality when employed as part of computer system/server 110 and/or computing node 100.

Figure 2:
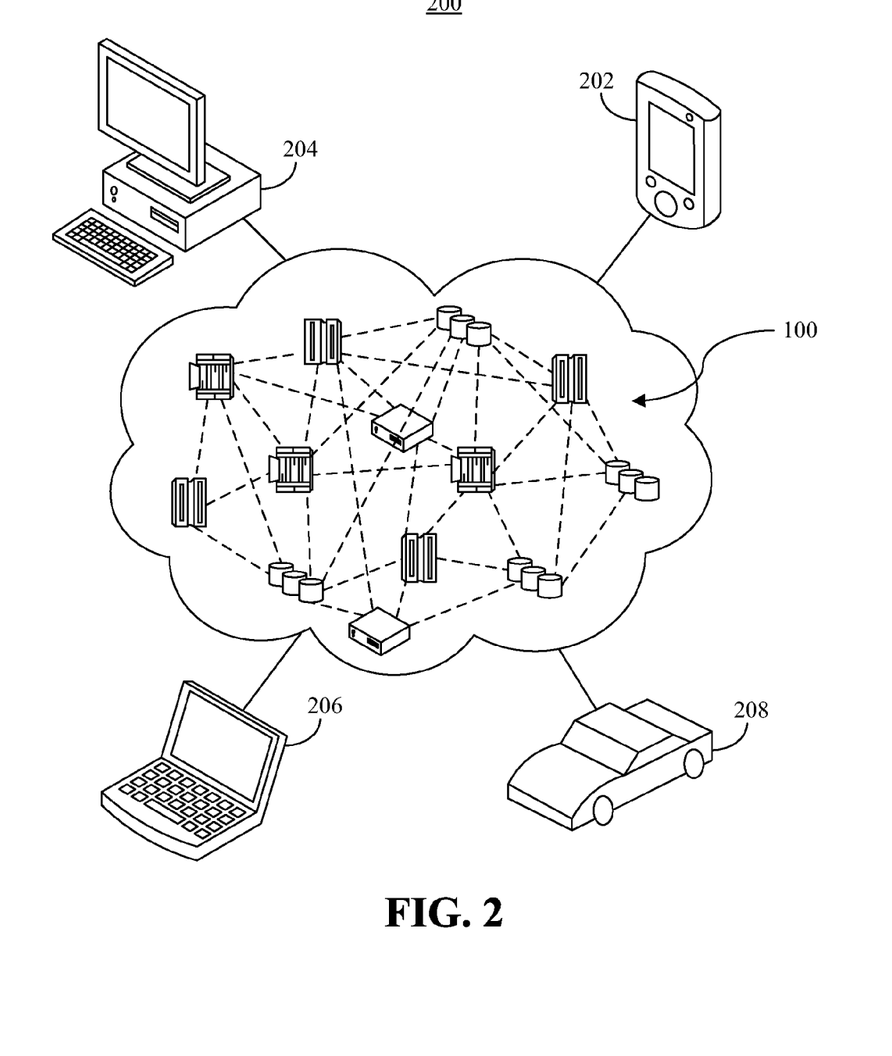
FIG. 2 depicts an exemplary cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 202, desktop computer 204, laptop computer 206, and/or automobile computer system 208 may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202, 204, 206, and/or 208 shown in FIG. 2 are intended to be illustrative only and that computing nodes 100 and cloud computing environment 200 can communicate with any type of computerized device over any type of network and/or network addressable connection (e.g., using a web browser).

Figure 3:
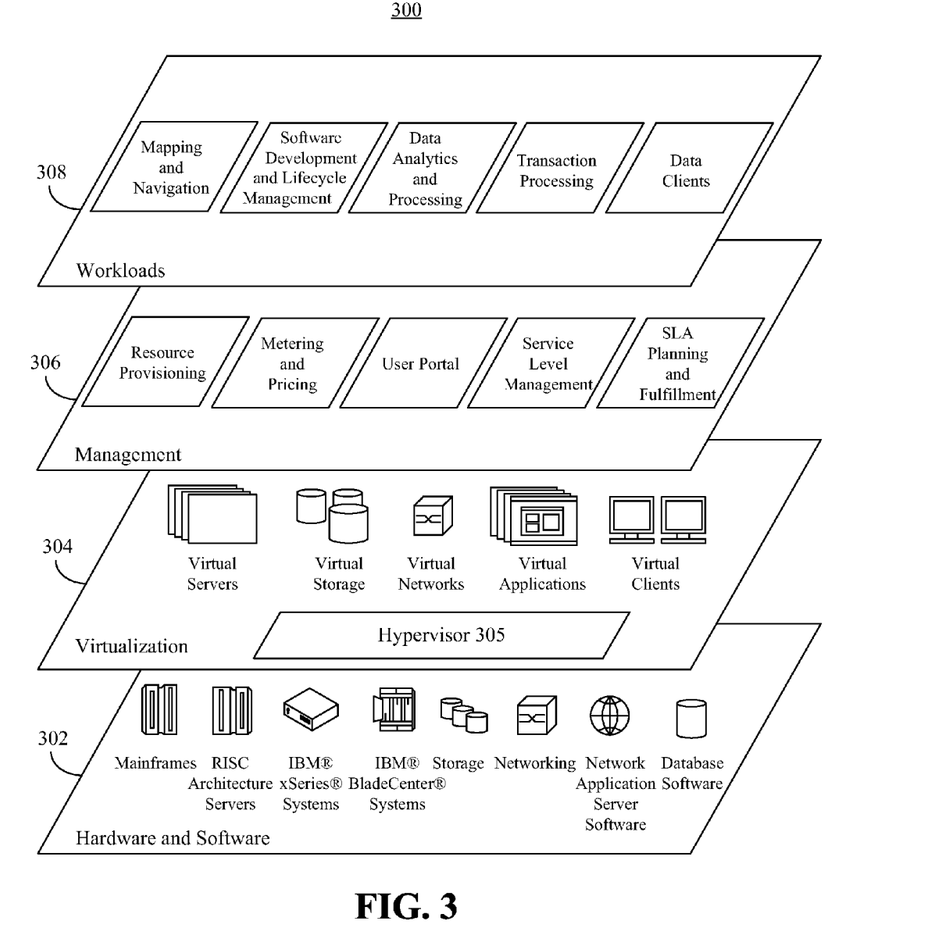
FIG. 3 depicts exemplary abstraction model layers for a cloud computing environment.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients. Virtualization layer 304 further includes a hypervisor 305 that is configured to manage the various virtual resources, e.g., virtual machines, of virtualization layer 304 and to manage mapping of such virtual resources to physical resources of the hardware and software layer 302.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data clients, e.g., mobile desktops.

Figure 4:
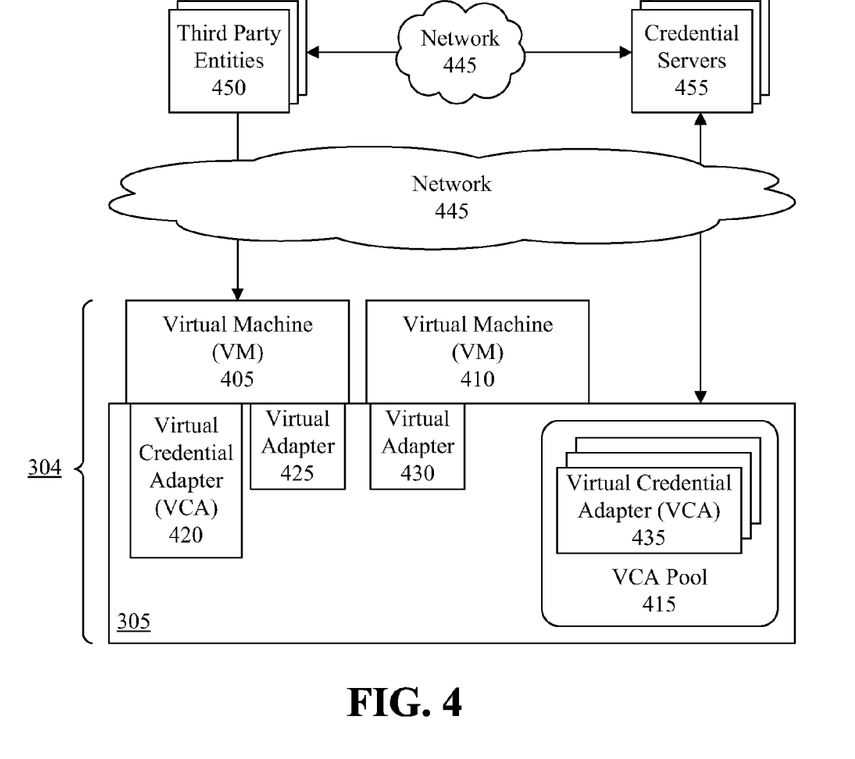
FIG. 4 is a block diagram illustrating an exemplary implementation of a hypervisor managing credentials using virtual credential adapters (VCAs).

FIG. 4 is a block diagram illustrating an exemplary implementation of a hypervisor managing credentials using VCAs. As pictured in FIG. 4, virtualization layer 304 includes hypervisor 305, a VM 405, and a VM 410. Hypervisor 305 further includes a VCA pool 415. VCA pool 415 includes, or stores, one or more VCAs such as VCA 435 that are not currently associated with any VM. As shown, VM 405 is associated with VCA 420 and virtual adapter 425. VM 410 is associated with virtual adapter 430.

VM 405, VM 410, and/or hypervisor 305 may communicate with one or more third party entities such as third party entity 450 and/or one or more credential servers such as credential server 455 via network 445. The third party entities, e.g., third party entity 450, represent one or more Web services, database services, or other computing resource for which proper credentials are required for authentication of the VM attempting to access such computing resource. Credential servers such as credential server 455 operate as the certifying authority for the various credentials maintained by the VCAs.

Network 445 is the medium used to provide communication links between various devices, data processing systems, and VMs. Network 445 may include connections, such as wire, wireless communication links, or fiber optic cables. Network 445 may be implemented as, or include, any of a variety of different communication technologies such as a Wide Area Network (WAN), a Local Area Network (LAN), a wireless network, a mobile network, a Virtual Private Network (VPN), the Internet, the Public Switched Telephone Network (PSTN), or the like.

As defined within this disclosure, a "hypervisor" is a computer program that executes within a host data processing system and manages one or more VMs such as VM 405 and/or VM 410. Referring to FIG. 4, hypervisor 305 allows VMs 405 and/or 410 to execute within a single host data processing system, e.g., a cloud computing node. In one aspect, hypervisor 305 further may allow one or both of VMs 405 and/or 410 to migrate to another host data processing system for execution. Hypervisor 305 presents each of VMs 405 and/or 410 with a virtual operating platform and manages the execution of each VM instantiated within virtualization layer 304. Hypervisor 305 determines the amount of computing resources of the host data processing system and/or other computing resources that are allocated to VM 405 and/or VM 410 within virtual layer 304.

VMs 405 and 410 may be any of a variety of different VMs. As used within this disclosure, a "virtual machine" or "VM" is a software implementation of a physical machine. A VM executes program code much like a physical data processing system. Examples of different types of VMs, as described with reference to FIG. 3, include, but are not limited to, virtual servers, virtual storage, a virtual network, a virtual appliance, or a virtual client. For purposes of explanation, reference to a VM may refer to a particular VM or a particular instance of a particular VM, without limitation, unless otherwise expressly stated or the context indicates otherwise.

In one aspect, hypervisor 305 regulates access by each of VMs 405 and/or 410 to computing resources through one or more virtual adapters. As used herein, a "virtual adapter" means a virtualization of a physical adapter. A virtual adapter, when associated with a VM, for example, may allow the VM to communicate with another VM, with the hypervisor, and/or to utilize some, all, or none of a particular computing resource represented, or virtualized, by the virtual adapter. The operating system of a VM is able to communicate with, display, and configure a virtual adapter as if performing such functions and/or operations for a physical adapter. Examples of virtual adapters include, but are not limited to, virtual Ethernet adapters, virtual fiber channel adapters, virtual Small Computer Serial Interface (SCSI) adapters, virtual serial adapters, etc. A VM would also access computing resources such as the processor via a processor virtual adapter, etc.

Hypervisor 305 maps each virtual adapter, i.e., virtual adapters 425 and 430, to some portion of a corresponding computing resource, none of the corresponding computing resource, or the entirety of the corresponding computing resource. For example, consider the case in which virtual adapter 425 is a virtual Ethernet adapter. In that case, hypervisor 305 maps virtual adapter 425, which is associated with VM 405, to a physical Ethernet adapter residing within the hardware and software layer (e.g., hardware and software layer 302 of FIG. 3). By associating virtual adapter 425 with VM 405 and mapping at least a portion of the corresponding computing resource to virtual adapter 425, hypervisor 305 provides VM 405 with access to the physical Ethernet adapter. Hypervisor 305 permits a virtual adapter such as virtual adapter 425 to be associated with a single VM at any given time. Thus, while virtual adapter 425 is associated with VM 405, virtual adapter 425 may not be associated with VM 410. Similarly, while virtual adapter 430 is associated with VM 410, virtual adapter 410 may not be associated with VM 405.

As used within this disclosure, the term "virtual credential adapter" or "VCA" is a virtual adapter that maintains a credential or a virtual representation of the credential. As used within this disclosure, a "credential" is a digital asset that serves as an attestation of authority for, or confers one or more rights upon, a VM to utilize a particular computing resource. Examples of credentials include, but are not limited to, usernames and/or passwords, private key and public key pairs, application licenses, physical devices such as memory, or the like that may be used to authenticate a VM to a third party entity. Further examples of credentials may include, but are not limited to, a smart card, a computer readable medium such as an isolated storage device or a portion of RAM to which credential data may be written and/or read, etc. In general, a credential is a physical entity in that the credential may be a physical device including a portion of physical memory in which credential data may be stored.

Whereas a conventional virtual adapter provides the VM with access to a computing resource of the host data processing system, a VCA provides the VM with a credential that may be provided to, or used to, access a computing resource requiring the credential for authentication. Accordingly, association of a VCA with a VM may provide the VM with the credential necessary to access to a particular computing resource for which the credential is required. Referring to FIG. 3, VCA 420 manages a credential (not shown). Association of VCA 420 with VM 405 provides VM 405 with access to the computing resource associated with the credential managed by VCA 420. VM 405, for example, having been associated with VCA 420, may provide the credential managed by VCA 420 to a computing resource such as third party entity 450 for authentication purposes. The access provided to VM 405 by way of VCA 420 and/or the credential maintained by VCA 420 may be subject to various control mechanisms to be described herein in greater detail.

In one aspect, VCA 420 maintains a physical credential or set of more than one physical credentials. "Maintaining a credential," as applied to a VCA, includes, but is not limited to, managing the credential and/or providing a VM with access to the credential. For purposes of explanation, VCA 420 manages a single credential. It should be appreciated, however, that in other embodiments, a VCA may manage more than one credential. The credential managed by VCA 420 provides one or more rights referred to as a set or bundle of rights. The bundle of rights associated with a credential managed by VCA 420 are managed and/or determined by credential servers 455, e.g., a particular one of credential servers 455.

In general, VCA 420 is the only VCA permitted to access and/or interface with the credential managed by VCA 420. Hypervisor 305, for example, may prevent overscheduling and/or sharing of the credential maintained by VCA 420 in accordance with a policy prohibiting sharing of credentials among VCAs. In another aspect, however, hypervisor 305 may permit overscheduling and/or sharing of the credential between VCA 420 and one or more other VCAs in accordance with a policy that does permit sharing of credentials among VCAs. It should be appreciated that a policy may be credential specific so that sharing may be allowed or prohibited on a per credential basis within hypervisor 305. In the event that sharing of a physical credential is permitted by multiple VCAs, each VM having an associated VCA sharing the physical credential may operate as if that VM has sole access to the credential. The VM may behave and operate as if that VM has its own unique credential.

Hypervisor 305 manages VCAs in substantially the same way as virtual adapters. For example, hypervisor 305 allows VCA 420, or any other VCA, to be associated with, at most, one VM at any given time. In one aspect, when VCA 420 is not associated with any VM, VCA 420 is returned to VCA pool 415 and stored other unused VCAs. Any VCA stored within VCA pool 415 is available for association with a VM. In another aspect, VCA 420 may be disassociated from one VM, i.e., VM 405, and associated with another VM such as VM 410.

In another aspect, VCAs may be used as part of a security protocol implemented within hypervisor 305. Consider a scenario where VM 410 is instantiated by a user and is attempting to operate. Since VM 410 is not associated with a VCA, hypervisor 305 does not allocate any computing resources, e.g., processor cycles, to VM 410. By comparison, VCA 420, which may be used to implement the security protocol and which is associated with VM 405, does entitle VM 405 to execute.

In operation, hypervisor 305 associates VCA 420 with VM 405. In one aspect, the credential maintained by VCA 420 may be stored within VCA 420 at the time that VCA 420 is associated with VM 405. In another aspect, however, hypervisor 305 may include the credential to be maintained by VCA 420 subsequent to association of VCA 420 with VM 405. In either case, VM 405 may authenticate with third party entity 450 via network 445 using the credential maintained by VCA 420. Thus, VM 405 is unable to access third party entity 450 without VCA 420 first being associated therewith and without VCA 420 maintaining a credential therein. Because VM 405 is designed to operate using one or more virtual adapters, VM 405 seamlessly uses the credential maintained by VCA 420 for use with third party entity 450.

In one aspect, hypervisor 305 notifies credential servers of associations of VCA to VMs and/or of disassociations of VCAs from VMs. For example, responsive to hypervisor 305 associating VCA 420 with VM 405, hypervisor notifies credential server 455, which is the certifying authority for the credential maintained by VCA 420, that VCA 420 is now associated with VM 405. In the event that hypervisor 305 disassociates VCA 420 from VM 405, hypervisor 305 may notify credential server 450 of the disassociation.

In still another aspect, hypervisor 305 is configured to query the credential server 455 to determine whether VM 405 is authorized to be associated with VCA 420. It should be appreciated that third party entity 450, to which VM 405 is authenticated by virtue of VCA 420, also may communicate with credential server 455 via network 445 to verify the credential provided by VM 405. For example, in communicating with credential server 455, third party entity 450 may determine the particular right or rights afforded VM 405 by virtue of the association of VM 405 with VCA 420.

Figure 5:
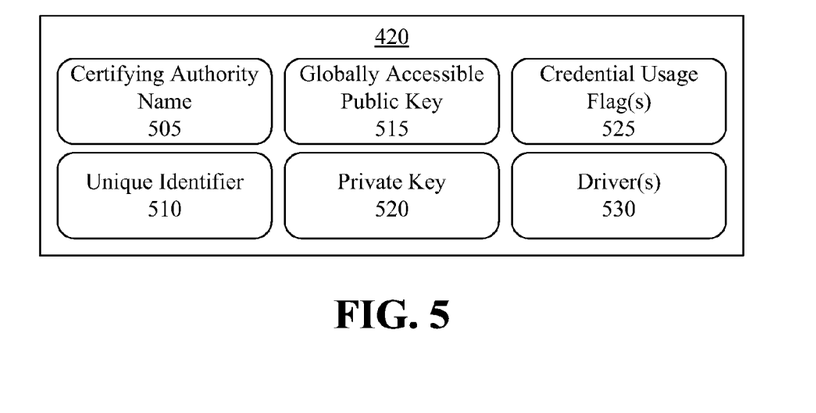
FIG. 5 is a block diagram illustrating an exemplary implementation of a VCA.

FIG. 5 is a block diagram illustrating an exemplary implementation of a VCA. More particularly, FIG. 5 illustrates an exemplary implementation of VCA 420 of FIG. 4.

As shown, VCA 420 includes a certifying authority name 505. In one aspect, VCA 420 maintains, and is thereby associated with, a particular credential. The credential maintained by VCA 420 is associated with a particular certifying authority indicated by certifying authority name 505 within VCA 420. VCA 420 further includes a unique identifier 510. Each VCA within the hypervisor includes a unique identifier. Unique identifier 510 allows the hypervisor to associate particular VCAs with particular certifying authorities and track such associations.

In one aspect, VCA 420 also includes a globally accessible public key 515. Further, VCA 420 includes a private key 520. Private key 520 is only accessible by the particular VM with which VCA 420 is associated. Referring to FIG. 4, for example, VM 405 has access to private key 520, whereas VM 410 does not.

VCA 420 also may include one or more credential usage flags 525. In general, each of credential usage flags 525 provides status information for usage of the credential managed by VCA 420. The status information from the credential usage flags 525 may be read by hypervisor 305 and, as such, provide a mechanism for passing state information between VM 405 and/or VCA 420 and hypervisor 305. For example, a credential usage flag 525 may indicate whether the credential managed by VCA 420 is shared, whether the credential is active, and/or how the credential is being used by the VM to which VCA 420 is associated. Hypervisor 305, for example, may query VCA 420 while associated with VM 405 to determine whether VM 405 is actually utilizing the credential managed by VCA 420, e.g., query the state of one or more or all of credential usage flags 525. One or more credential usage flags 525 further may be used as a control mechanism by hypervisor 305 for VCA 420. In that case, hypervisor 305 may turn one or more flags on or off thereby dictating terms of usage of the credential maintained by VCA 420 to any VM associated therewith. In the event that VCA 420 is disassociated from VM 405 and returned to the VCA pool, hypervisor 305 also may set the appropriate credential usage flag(s) 525 to indicate that the credential is not in use.

VCA 420 further includes one or more drivers 530. Driver(s) 530 are utilized by the VM with which VCA 420 is associated to obtain access to the credential maintained by VCA 420. Further, driver(s) 530 may be accessed, or used, by the hypervisor to obtain information relating to the VM with which VCA 420 is associated. Hypervisor 305 also may read and/or write credential usage flag(s) 525 using driver(s) 530 and/or access any other module. In one aspect, drivers 530 determine whether the VM associated with VCA 420 is utilizing the credential and updates credential usage flags 525 as appropriate.

Because VCAs maintain credentials and the VCAs are entities that exist independently of VMs regardless of whether a VM is executing or instantiated, the credentials maintained by VCAs may are accessible by other entities. Thus, not only can a credential maintained by a VCA be utilized while a VM is executing, but the hypervisor and/or a trusted management tool may access and/or manage the credential through the VCA whether or not any given VM is executing.

Managing credential(s) using a virtual adapter provides increased flexibility in that a virtualized workload may exist for a short term period of time or a long term period of time. Any credential or credentials needed by a VM to perform the workload may be provided to the VM for the amount of time needed and then removed or provided to another different VM. In one aspect, the credential is provided to a VCA associated with a VM, and then removed from the VCA and, for example, provided to another VCA which may or may not be associated with another, different VM. In another aspect, the hypervisor may associate a VCA to a VM thereby providing a needed credential to the VM and subsequently disassociate the VCA from the VM upon completion of the workload.

In addition, managing credential using VCAs allows more cost effective management of credentials. Consider a scenario in which the VM includes a credential such as a license instead of using a VCA as described herein. The VM, in addition to storing the license, may also need to report, e.g., send packets, to a credential server such as a license manager from time to time or periodically as the case may be to authenticate. The authentication by sending packets allows the VM to continue to utilize the particular computing resource, e.g., an application. If the VM stops operating, e.g., crashes, the credential contained therein is idle and unused. The credential cannot be extricated from the VM without recovering the VM or otherwise restarting the VM. If, however, the credential were maintained in a VCA associated with the VM, the credential could be better managed. For example, the credential could be moved to another VCA and used with another VM or the VCA associated with the crashed VM may be disassociated from the crashed VM and associated with a different VM, thereby allowing the different VM to utilize the credential. In this example, the same credential may be used by different VMs at different times to fulfill the same role or perform the same function.

Figure 6:
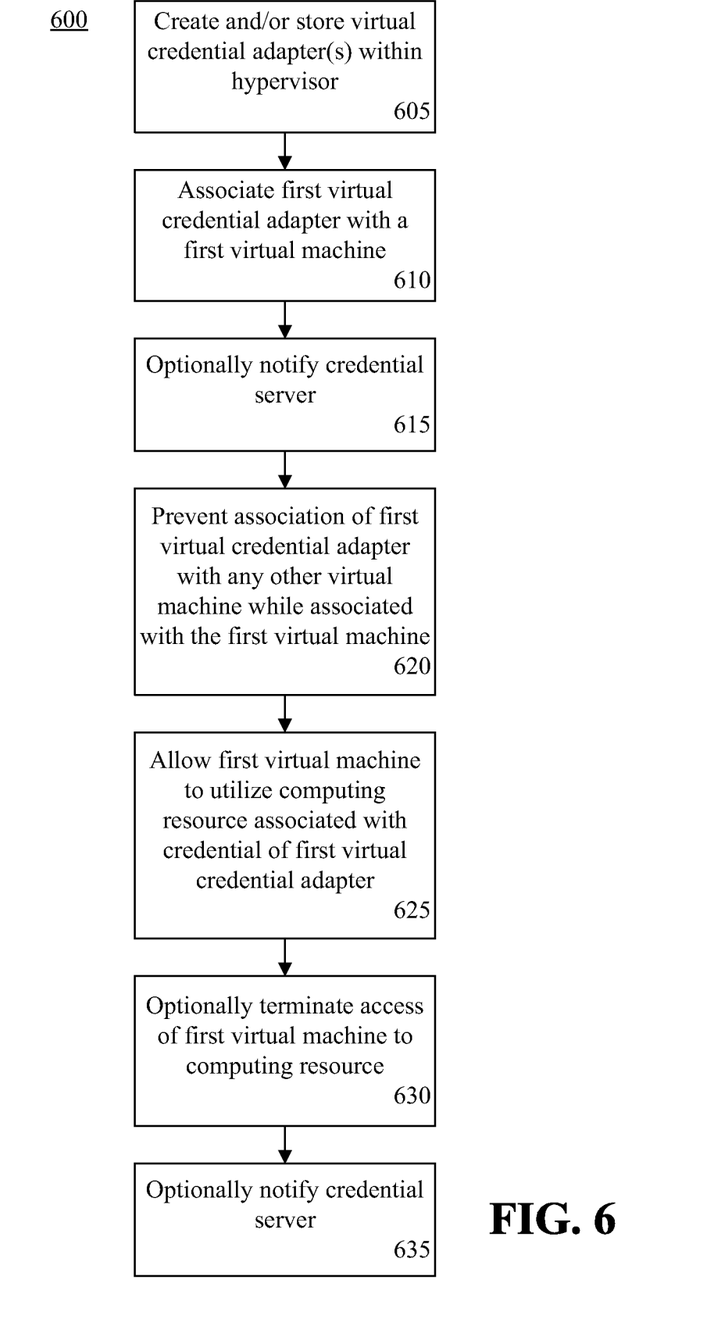
FIG. 6 is a flow chart illustrating an exemplary method of managing a credential using a VCA.

FIG. 6 is a flow chart illustrating an exemplary method 600 of managing a credential using a VCA. Method 600 may be performed by a hypervisor executing within a virtualization layer of a data processing system such as a cloud computing node.

Method 600 begins in block 605 where the hypervisor creates and/or stores one or more VCAs. In one aspect, the VCAs that are not associated with a VM may be stored within a VCA pool. In block 610, the hypervisor associates a first VCA with a first virtual machine.

For example, an administrator may create a VM. The administrator, as part of creating the VM, specifies one or more VCAs as part of the hardware configuration for the VM. The VCAs, for example, may be specified by the administrator in the same manner as specifying the amount of RAM, CPU, storage, or the like that are to be allocated to the VM.

In another example, software executing within a VM may determine that a credential is needed to perform a particular function such as accessing a resource or other asset on a network. Responsive to determining that no credential exists for the VM to access the resource, the VM negotiates and/or requests a credential from the hypervisor. For example, the VM may inquire with the hypervisor whether a VCA with the correct type of credential is available and request that such a VCA be associated with the VM that is hosting the software.

In one aspect, the hypervisor may include the credential within the first VCA. The credential may be included within the first VCA prior to association of the first VCA with the first VM or subsequent to association of the first VCA with the first VM. The hypervisor, for example, may move a credential from one VCA to another. In still another aspect, including a credential within a VCA may mean that the hypervisor changed a credential usage flag used to control access by a VM to the credential to "used" or another similar state that, when interpreted by the VCA, permits a VM associated with the VCA to utilize the credential.

In block 615, the hypervisor optionally notifies the credential server specified by the certifying authority name stored within the first VCA that the first VCA has been associated with the first VM. In another aspect, the hypervisor may also query the credential server to determine whether the first VM may be associated with the first VCA. Such querying may be performed by the hypervisor prior to association of the first VCA with the first VM or subsequent to associating the first VCA with the first VM.

In block 620, while the first VCA is associated with the first VM, the hypervisor prevents the first VCA from being associated with any other VM. In block 625, the first VM is allowed to utilize the computing resource associated with the credential maintained by the first VCA. More particularly, the first VM uses the credential maintained by the first VCA to access the computing resource. For example, the first VM may use the credential to authenticate with the computing resource. Once authenticated, the first VM may interact with, and/or utilize, the computing resource. As previously discussed, the credential server may indicate to the computing entity, e.g., a third party entity, the particular right or bundle of rights that may be exercised by the VM associated with the first VCA.

In block 630, the hypervisor optionally terminates the access of the first VM to the computing resource. In one aspect, the hypervisor disassociates the first VCA from the first VM. For example, the first VCA may be returned to the VCA pool and, if desired, associated with a second, and different VM. In another aspect, the credential maintained by the first VCA may be removed from the first VCA and loaded into a second and different VCA. The second and different VCA may be located or stored within the VCA pool or associated with a second and a different VM.

In still another aspect, the hypervisor may, by writing to the appropriate credential usage flag(s) of the first VCA, disable the credential for further use by the first VM. The hypervisor may write to a credential usage flag dedicated for credential control and change the flag to "unused" thereby rendering the credential of the VCA unavailable to the first VM. A second VCA also having access, or maintaining, the credential, may then be enabled by the hypervisor writing to the appropriate credential usage flags of the second VCA. For example, the hypervisor may change a credential usage flag of the second VCA to "used."

In block 635, the hypervisor optionally notifies the credential server of the termination of access performed in block 630. The hypervisor, for example, may notify the credential server that the first VM is no longer using the credential maintained by the first VCA, that the credential has been moved to a different VCA, or the like.

In accordance with the inventive arrangements disclosed herein, credentials are managed using VCAs, which are entities independent of the VMs to which the VCAs provide credential access. As such, credentials may utilized among VMs more efficiently since VCAs may be associated with, and/or disassociated from VMs as may be needed to accommodate workload requirements. Because virtual adapters are entities that are managed by hypervisors and utilized by VMs, use of a VCA provides VMs with seamless access and/or use of credentials. Moreover, the hypervisor or other entity may manage credentials maintained by VCAs regardless of whether the VCA is associated with a VM.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   storing a first virtual credential adapter within a hypervisor executing within a host data processing system, wherein the first virtual credential adapter maintains a credential for a computing resource;
   associating, using a processor of the host data processing system, the first virtual credential adapter with a first virtual machine, wherein the first virtual credential adapter is associated, at most, with a single virtual machine at any time; and
   responsive to associating the first virtual credential adapter with the first virtual machine, the first virtual machine accessing the computing resource using the credential maintained by the first virtual credential adapter.

2. The method of claim 1, wherein the first virtual credential adapter is associated with the first virtual machine responsive to a request from the first virtual machine to the hypervisor.

3. The method of claim 1, further comprising:
   including the credential within the first virtual credential adapter prior to association of the first virtual credential adapter with the first virtual machine.

4. The method of claim 1, further comprising:
   including the credential within the first virtual credential adapter subsequent to association of the first virtual credential adapter with the first virtual machine.

5. The method of claim 1, further comprising:
   terminating access of the first virtual machine to the computing resource.

6. The method of claim 5, wherein terminating access of the first virtual machine to the computing resource comprises:
   changing a credential usage flag of the first virtual credential adapter to unused.

7. The method of claim 5, wherein terminating access of the first virtual machine to the computing resource comprises:
   moving the credential from the first virtual credential adapter to a second virtual credential adapter not associated with the first virtual machine.

8. The method of claim 5, wherein terminating access of the first virtual machine to the computing resource comprises:
   disassociating the first virtual credential adapter from the first virtual machine.

9. The method of claim 1, wherein the first virtual credential adapter comprises an indicator that indicates to the hypervisor whether the credential is in use by the first virtual machine.

10. A system, comprising:
    a processor programmed to initiate executable operations comprising:
    storing a first virtual credential adapter within a hypervisor executing within a host data processing system, wherein the first virtual credential adapter maintains a credential for a computing resource;
    associating, using the processor, the first virtual credential adapter with a first virtual machine, wherein the first virtual credential adapter is associated, at most, with a single virtual machine at any time; and
    responsive to associating the first virtual credential adapter with the first virtual machine, the first virtual machine accessing the computing resource using the credential maintained by the first virtual credential adapter.

11. The system of claim 10, wherein the first virtual credential adapter is associated with the first virtual machine responsive to a request from the first virtual machine to the hypervisor.

12. The system of claim 10, wherein the processor is further programmed to initiate executable operations comprising:
    including the credential within the first virtual credential adapter prior to association of the first virtual credential adapter with the first virtual machine.

13. The system of claim 10, wherein the processor is further programmed to initiate executable operations comprising:
    including the credential within the first virtual credential adapter subsequent to association of the first virtual credential adapter with the first virtual machine.

14. The system of claim 10, wherein the processor is further programmed to initiate executable operations comprising:
    terminating access of the first virtual machine to the computing resource.

15. The system of claim 14, wherein terminating access of the first virtual machine to the computing resource comprises:
    changing a credential usage flag of the first virtual credential adapter to unused.

16. The system of claim 14, wherein terminating access of the first virtual machine to the computing resource comprises:
    moving the credential from the first virtual credential adapter to a second virtual credential adapter not associated with the first virtual machine.

17. The system of claim 14, wherein terminating access of the first virtual machine to the computing resource comprises:
    disassociating the first virtual credential adapter from the first virtual machine.

18. The system of claim 10, wherein the first virtual credential adapter comprises an indicator that indicates to the hypervisor whether the credential is in use by the first virtual machine.

19. A computer program product comprising a computer readable storage medium having program code stored thereon, the program code executable by a processor to perform a method comprising:
    storing, using the processor, a first virtual credential adapter within a hypervisor executing within a host data processing system, wherein the first virtual credential adapter maintains a credential for a computing resource;
    associating, using the processor, the first virtual credential adapter with a first virtual machine, wherein the first virtual credential adapter is associated, at most, with a single virtual machine at any time; and
    responsive to associating the first virtual credential adapter with the first virtual machine, the first virtual machine accessing, using the processor, the computing resource using the credential maintained by the first virtual credential adapter.

20. The computer program product of claim 19, wherein the method further comprises:

terminating access of the first virtual machine to the computing resource.

* * * * *